United States Patent
Kawano

(10) Patent No.: US 10,970,896 B2
(45) Date of Patent: Apr. 6, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Atsushi Kawano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 103 days.

(21) Appl. No.: 15/793,327

(22) Filed: Oct. 25, 2017

(65) Prior Publication Data
US 2018/0122117 A1    May 3, 2018

(30) Foreign Application Priority Data

Nov. 2, 2016  (JP) .............................. JP2016-215302
Aug. 2, 2017  (JP) .............................. JP2017-150018

(51) Int. Cl.
| | |
|---|---|
| G06K 9/46 | (2006.01) |
| G06K 9/66 | (2006.01) |
| G06T 11/60 | (2006.01) |
| G06T 11/00 | (2006.01) |
| G06T 7/80 | (2017.01) |
| G06T 1/00 | (2006.01) |
| G06T 7/60 | (2017.01) |

(52) U.S. Cl.
CPC ............ *G06T 11/60* (2013.01); *G06T 1/0007* (2013.01); *G06T 7/60* (2013.01); *G06T 7/80* (2017.01); *G06T 11/00* (2013.01); *G06T 2207/30196* (2013.01)

(58) Field of Classification Search
None
See application file for complete search history.

(56) References Cited

U.S. PATENT DOCUMENTS

| 6,335,985 B1 * | 1/2002 | Sambonsugi ........ G06K 9/3241 |
| | | 382/190 |
| 6,434,271 B1 * | 8/2002 | Christian ........... G06K 9/00369 |
| | | 348/169 |

(Continued)

FOREIGN PATENT DOCUMENTS

| EP | 3043329 A2 | 7/2016 |
| JP | 4578044 B2 | 11/2010 |
| JP | 5834193 B2 | 12/2015 |

OTHER PUBLICATIONS

Chen et al., "Tools for protecting the privacy of specific individuals in video." EURASIP Journal on Advances in Signal Processing 2007, No. 1 (2007): 075427. (Year: 2007).*

(Continued)

*Primary Examiner* — Feng Niu
(74) *Attorney, Agent, or Firm* — Canon U.S.A., Inc. IP Division

(57) ABSTRACT

In order to select a suitable background image for an image subjected to privacy protection, an image processing apparatus acquires a captured image, and extracts a subject region corresponding to a predetermined subject from the captured image. The image processing apparatus selects a background image to be used for processing from a plurality of background images, based on the captured image, and performing processing for abstracting the extracted subject region for the selected background image.

10 Claims, 9 Drawing Sheets

(56) References Cited

U.S. PATENT DOCUMENTS

| | | | | |
|---|---|---|---|---|
| 7,136,525 | B1* | 11/2006 | Toyama | G06K 9/38 382/173 |
| 7,489,817 | B2* | 2/2009 | Toyama | G06K 9/38 382/173 |
| 7,515,750 | B2* | 4/2009 | Toyama | G06K 9/38 382/173 |
| 7,548,648 | B2* | 6/2009 | Toyama | G06K 9/38 382/173 |
| 7,577,294 | B2* | 8/2009 | Toyama | G06K 9/38 345/611 |
| 8,027,534 | B2* | 9/2011 | Ono | H04N 5/2625 382/172 |
| 8,515,124 | B2* | 8/2013 | Yoo | G06K 9/00 382/100 |
| 8,542,948 | B2* | 9/2013 | Kato | H04N 7/15 382/294 |
| 8,548,256 | B2* | 10/2013 | Loui | G06K 9/00677 382/218 |
| 8,630,442 | B2* | 1/2014 | Connell | G06K 9/38 382/100 |
| 9,049,379 | B2* | 6/2015 | Choi | G06K 9/00275 |
| 9,684,819 | B2* | 6/2017 | Choi | G06K 9/00275 |
| 9,693,023 | B2* | 6/2017 | Fujii | H04N 5/232945 |
| 9,911,002 | B2* | 3/2018 | Shim | H04N 1/4486 |
| 10,282,877 | B2* | 5/2019 | Bedi | G06T 5/005 |
| 2012/0001902 | A1* | 1/2012 | Lee | G06T 5/005 345/419 |
| 2014/0085433 | A1* | 3/2014 | Han | H04N 13/351 348/51 |
| 2015/0221066 | A1* | 8/2015 | Kobayashi | G06T 7/194 382/284 |
| 2016/0034704 | A1* | 2/2016 | Shim | H04N 1/4486 726/26 |
| 2016/0156575 | A1* | 6/2016 | Jeong | H04L 51/10 709/206 |
| 2016/0210756 | A1* | 7/2016 | Konishi | G06T 7/20 |

OTHER PUBLICATIONS

Padilla-López et al., "Visual privacy by context: proposal and evaluation of a level-based visualisation scheme." Sensors 15, No. 6 (2015): 12959-12982. (Year: 2015).*

Yasutomo Kawanishi, Background image generation by preserving lighting condition of outdoor scenes, Procedia Social and Behavioral Science 2 (2010) 129-136.

Thomas Winkler, Security and Privacy Protection in Visual Sensor Networks: A Survey, ACM Computing Surveys, vol. 47, No. 1, Article 2, Apr. 2014, 2:1-2:42.

Wikipedia; "Gyroscope;" https://en.wikipedia.org/w/index.php?title=Gyroscope&oldid=745895604; Nov. 11, 2019; pp. 1-10.

* cited by examiner

TIME: 14:00:00
WHITE BALANCE: 5000
ILLUMINANCE: SUFFICIENT

TIME: 10:00:00
WHITE BALANCE: 5500
ILLUMINANCE: SUFFICIENT

TIME: 22:00:00
WHITE BALANCE: 200
ILLUMINANCE: LOW

IMAGE PROCESSING APPARATUS, IMAGE PROCESSING METHOD, AND STORAGE MEDIUM

BACKGROUND

Field

The present invention relates to an image processing apparatus, an image processing method, and a storage medium that are used for protecting privacy on an image captured by a monitoring camera.

Description of the Related Art

Currently, monitoring cameras are installed at many areas. Along therewith, the protection of personal privacy included in video images captured by the monitoring cameras is becoming more important. Japanese Patent No. 5834193 discloses a technique for generating a video image where a human body region is masked by using a human body detection result. Japanese Patent No. 4578044 discloses a technique with which a reception unit, which has received outline information of a difference region between images extracted by a monitoring module, synthesizes the outline information with a background image to display a synthesized image.

In the technique that replaces the inside of the mask region generated based on a result of recognition processing discussed in Japanese Patent No. 5834193 with a mask image, if the recognition processing fails, there is a high possibility that a subject will be exposed. Further, since the technique discussed in Japanese Patent No. 4578044 is a technique for synthesizing outline information with a fixed background, a change that actually occurs in a monitoring region covered by a camera (hereinafter, suitably referred to as an environmental change in the real world) is not taken into account. Thus, it becomes hard for a user to recognize the environmental change.

SUMMARY

According to an aspect of the present invention, an image processing apparatus includes an acquisition unit configured to acquire a captured image, an extraction unit configured to extract a subject region corresponding to a predetermined subject from the captured image, a selection unit configured to select a background image to be used for processing from a plurality of background images, based on the captured image, and a processing unit configured to abstract, for the background image selected by the selection unit, the subject region extracted by the extraction unit.

Further features of the present invention will become apparent from the following description of exemplary embodiments with reference to the attached drawings.

DESCRIPTION OF THE EMBODIMENTS

Exemplary embodiments of the present invention will be described below with reference to the drawings.

Figure 1:
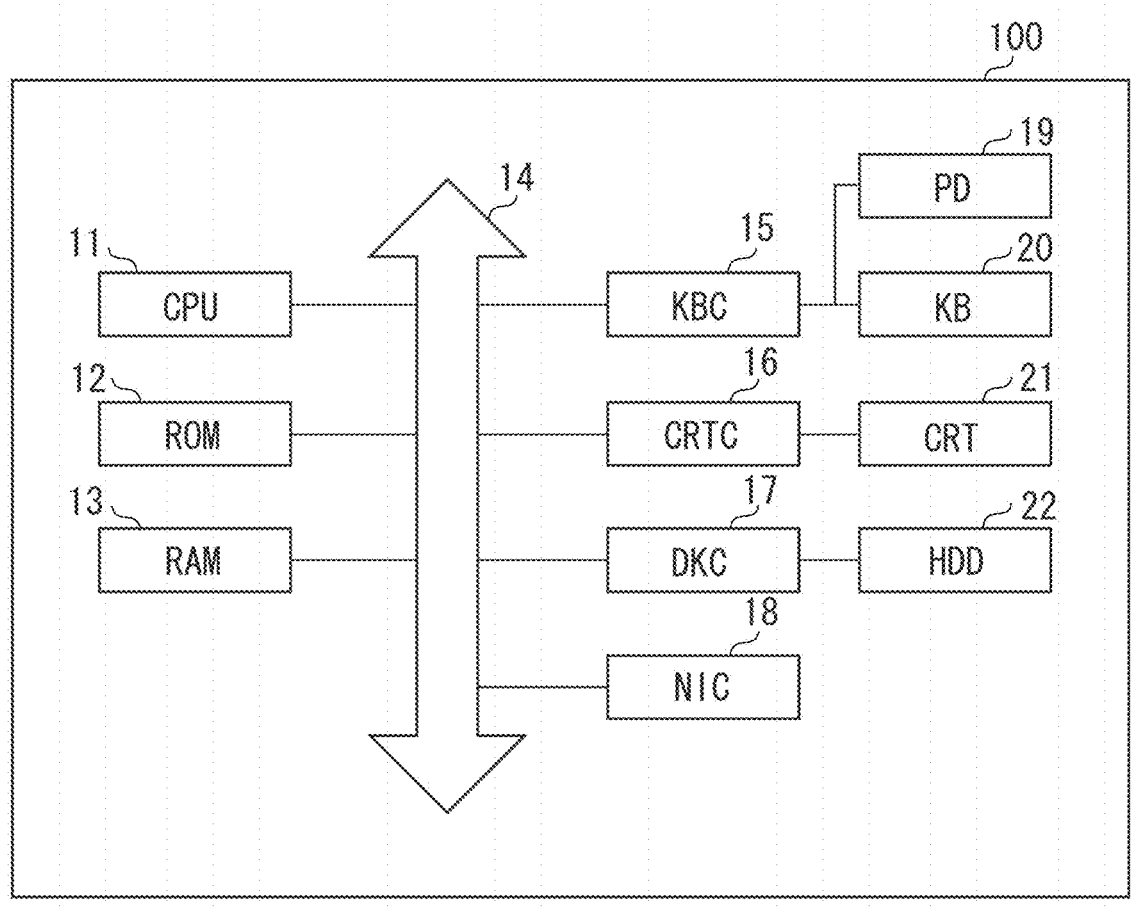
FIG. 1 is a block diagram illustrating a hardware configuration of an image processing apparatus.

FIG. 1 is a block diagram illustrating a hardware configuration of an image processing apparatus 100.

A central processing unit (CPU) 11 performs control of respective devices connected to a system bus 14.

A read-only memory (ROM) 12 stores a basic input/output system (BIOS) program and a boot program.

A random access memory (RAM) 13 is used as a main storage device of the CPU 11.

A keyboard controller (KBC) 15 executes processing relating to input of information from a pointing device (PD) 109, such as a mouse, and from a keyboard (KB) 20.

A display control unit (CRTC) 16, which contains a video memory, performs drawing in the video memory in accordance with an instruction from the CPU 11, and outputs, as a video signal, image data drawn in the video memory to a cathode-ray tube (CRT) 21. Although FIG. 1 illustrates the CRT 21 as a display device, any type of the display device (e.g., liquid crystal display device) may be used.

A disk controller (DKC) 17 accesses to a hard disk (HDD) 22.

A network interface card (NIC) 18 is connected to a network, and performs information communication via the network.

The HDD 22 stores an OS program and programs of various applications that operate on the OS. The HDD 22 is an example of a storage area.

In the above configuration, when the image processing apparatus 100 is turned ON, the CPU 11 loads the OS program from the HDD 22 into the RAM 13 to execute processing in accordance with the boot program stored in the ROM 12. In such a manner, the image processing apparatus 100 realizes functions of respective devices.

The CPU 11 of the image processing apparatus 100 executes the processing based on the programs stored in the ROM 12 or the HDD 22. Thus, software configurations of the image processing apparatus 100 in FIGS. 2, 7, and 9 (described below) and processing in the flowchart of FIG. 3 (described below) are realized.

In a first exemplary embodiment, information processing of the image processing apparatus 100 will be described. In the information processing, a background image is selected based on similarity between portions of an input image and a background image each from which an object region is removed, the selected background image is synthesized with a mask image of a mask region, and a synthesized image (hereinafter, referred to as a privacy protected image) is generated. Thus, a person is obscured or masked.

Figure 2:
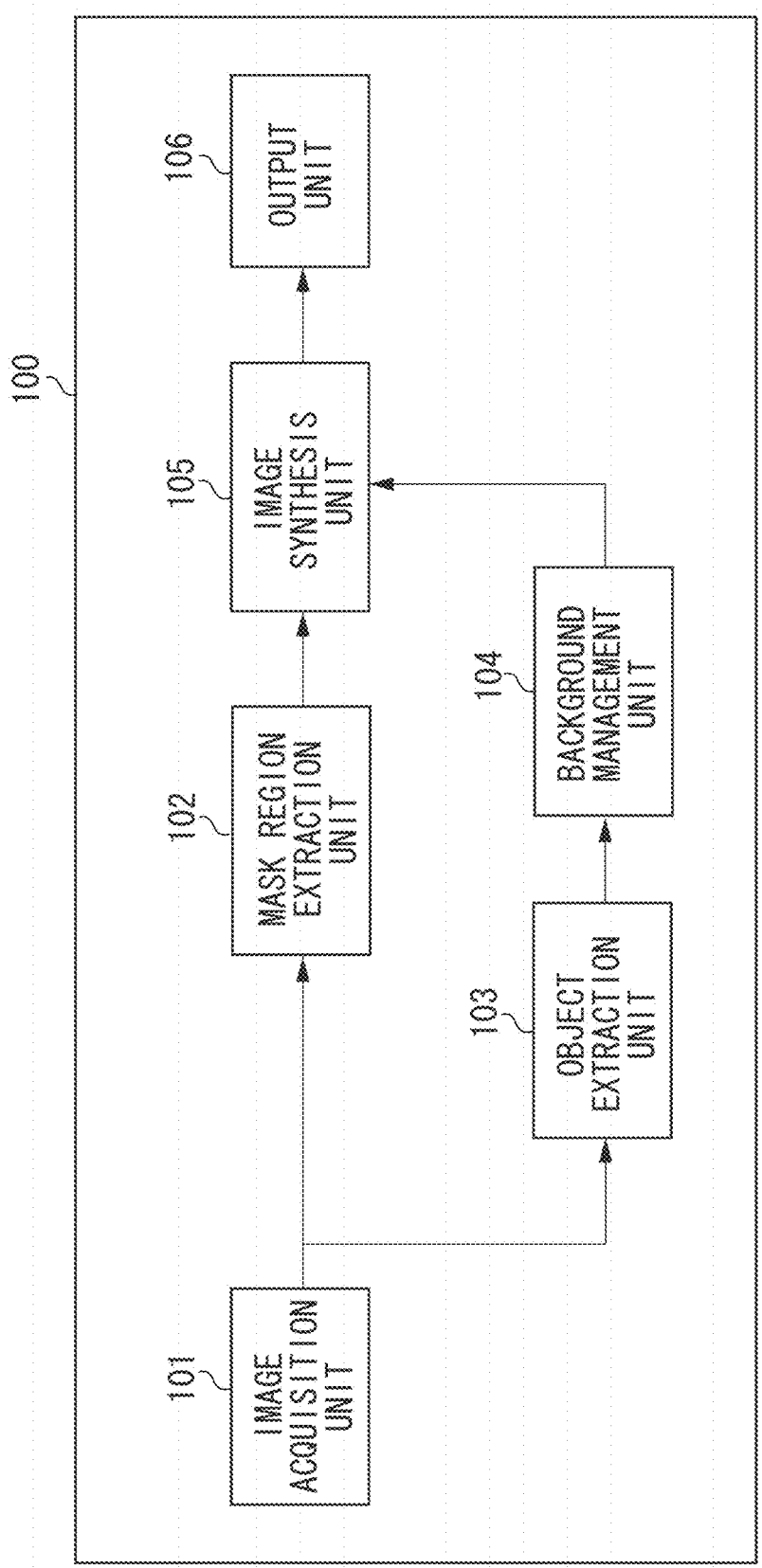
FIG. 2 is a block diagram illustrating an example of a software configuration of the image processing apparatus.

FIG. 2 is a block diagram illustrating an example of a software configuration of the image processing apparatus 100 according to the first exemplary embodiment. The image processing apparatus 100 includes an image acquisition unit 101, a mask region extraction unit 102, an object extraction unit 103, a background management unit 104, an image synthesis unit (abstraction processing unit) 105, and an output unit 106.

The image acquisition unit 101 sequentially acquires images at predetermined intervals from an image capturing unit such as a camera equipped with a lens and a sensor, and provides the images to the mask region extraction unit 102 and a state acquisition unit 203. The image capturing unit may be disposed in the image processing apparatus 100, or may be communicably connected to the image processing apparatus 100 via a network.

The mask region extraction unit 102 extracts a subject mask region that is a privacy protection target. The mask region extraction unit 102 extracts a mask region based on a difference between a background image for mask region extraction and the image acquired by the image acquisition unit 101. On the background image, a subject in an image-capturing region of the image processing apparatus 100 is not present. A method for extracting the background image for mask region extraction and the mask region will be described in detail below. The background image for mask region extraction is an image that has been captured at a viewing angle equal to a viewing angle of the image acquired by the image acquisition unit 101 and which does not include a privacy protection target. The mask region extraction unit 102 stores images acquired from the image acquisition unit 101 in an image storage unit (not illustrated) from the start of the processing of the image processing apparatus 100. At a stage where a predetermined number (e.g., 100) of images are stored in the image storage unit, the mask region extraction unit 102 averages pixel values of the images stored in the image storage unit to generate a background image for mask region extraction. Further, after generating the background image for mask region extraction, every time of acquisition of an image from the image acquisition unit 101, the mask region extraction unit 102 stores each image in the image storage unit and deletes an oldest image stored in the image storage unit. The mask region extraction unit 102 then averages pixel values of the images stored in the image storage unit to update the background image for mask region extraction. In other words, the mask region extraction unit 102 uses, as the background image for mask region extraction, an average image that has been generated by using a predetermined number (e.g., 100) of images from the acquisition time point of the image from the image acquisition unit 101. Alternatively, according to an object recognition method (e.g. pattern matching), the mask region extraction unit 102 acquires an object region from a plurality of the images acquired from the image acquisition unit 101, synthesizes pixel values of the plurality of images from which the object regions are removed to generate the background image for mask region extraction. As described above, any method for generating an image that does not include a subject of privacy protection may be used. The background image for mask region extraction drawn in the mask region extraction unit 102 is different from a background image drawn in the background management unit 104. Thereafter, the mask region extraction unit 102 determines, as a mask, pixels having a difference in a luminance value between the image acquired from the image acquisition unit 101 and the background image for mask region extraction exceeds a threshold (e.g., 10% or more) to extract a mask region. The mask region extraction unit 102 may execute any processing in which a region of privacy protection target (a subject region) can be extracted through image processing. For example, the mask region extraction unit 102 acquires a difference region between a stored previous image and a latest image acquired from the image acquisition unit 101, and executes processing for searching a person's feature (shape or color) on the difference region (pattern matching process). When a person's feature exists, the mask region extraction unit 102 extracts the difference region as a subject region.

The object extraction unit 103 extracts an object region from a latest image acquired from the image acquisition unit 101. The object extraction unit 103 stores previous images acquired from the image acquisition unit 101, and calculates a difference region between stored previous images and the latest image acquired from the image acquisition unit 101 to extract an object region. The object extraction unit 103 transmits the latest image and object region information of the extracted object region to the background management unit 104. The object extraction unit 103 may use any extraction method such as a background subtraction method or a template matching method to extract an object region as long as an object region can be extracted with the method. The method, therefore, is not limited to the above-described method.

The background management unit 104 manages a plurality of background images. The plurality of background images is one or more images that are captured at a same place and at a same viewing angle as a place and a viewing angle of an image acquired by the image acquisition unit 101 and in different time zones and in different states within the viewing angle. Taking an entrance of a shop as an example, one or more images are captured in different time zones such as morning, daytime, evening, and night, and in different states within the viewing angle such as states where a shutter at the shop entrance is closed or opened, and states where a door is closed or opened. The background management unit 104 stores these background images as an image file in the image storage unit (not illustrated). Further, the background management unit 104 selects a background images closest to the latest image processed by the object extraction unit 103 by using similarity between regions in which the object region extracted by the object extraction unit 103 is removed from the latest image and the background image (hereinafter, a determination region). For example, when the object extraction unit 103 extracts a right half region of the images as an object, the object extraction unit 103 selects a background image having highest similarity between a left half region of the latest image and a left half region of the background image. In the selection, the object extraction unit 103 extracts positions and feature vectors from determination regions of the latest image and the background image in accordance with feature points by using Speed-Up Robust Features (SURF). The feature points are portions within the determination regions where a luminance change amount is large. The object extraction unit 103 measures a Euclidean distance between the feature vectors between the latest image and the background image, and associates the feature vectors of the latest image and the background image to each other so that the distance becomes minimum. The object extraction unit 103 selects, as the closest background image, a background image of which similarity is minimum. Here, the similarly is a total of a sum of distances of corresponding feature vectors and a sum of color-difference components at corresponding positions. In such a manner, the object extraction unit 103 can select a background image in a time zone and a state close to a state of an image capturing environment by comparing the similarity of the determination regions. For example, when extracting a right half region of the images as an object, the object extraction unit 103 selects a background image of which similarity is highest between a left half region of the latest image and a left half region of the background image. In the selection, the object extraction unit 103 extracts positions and feature vectors from determination regions of the latest image and the background image at feature points by using Speeded Up Robust Features (SURF). The feature points are portions within the determination regions where a luminance change amount is large. The object extraction unit 103 measures a Euclidean distance between the feature vectors of the latest image and the background image, and associates the feature vectors of the latest image and the background image to each other so that the distance becomes minimum. The object extraction unit 103 selects, as the closest background image, a background image of which similarity is minimum. Here, the similarly is a total of a sum of distances of corresponding feature vectors and a sum of color-difference components at corresponding positions. In such a manner, the object extraction unit 103 can select a background image in a time zone and in a state close to a state of a latest image capturing environment by comparing the similarity between determination regions. The background management unit 104 selects the background image by determining similarity between a portion where the object region indicated by object region information is removed from the latest image and a portion where the object region indicated by the object region information is removed from each of the background images, i.e., similarity between portions other than the object regions. The extraction method of a feature point is not limited to SURF, and any method for extracting a feature point such a corner feature obtained in accordance with "features from accelerated segment test" (FAST). Further, the similarity determination is not limited to the method for comparing features at corresponding points of images, and any method for determining similar images may be used. The image synthesis unit 105 changes a color of, among the pixels of the background image selected by the background management unit 104, pixels corresponding to the mask region extracted by the mask region extraction unit 102 into a predetermined color (e.g., blue). In such a manner, the image synthesis unit 105 generates a privacy protected image. Alternatively, the image synthesis unit 105 generates a mask image where a color of the mask region extracted by the mask region extraction unit 102 is changes into a predetermined color (e.g., blue) and a color of a portion other than the mask region into a second predetermined color (e.g., white). The image synthesis unit 105 may then α-blend the mask image with the background image selected by the background management unit 104 to generate a privacy protected image.

The output unit 106 outputs the privacy protected image generated by the image synthesis unit 105 to an external apparatus connected to the image processing apparatus 100 in a wired or wireless manner. Further, the output unit 106 may output the privacy protected image to the HDD 22 or the CRT 21.

Next, a flow of the information processing in information processing apparatus 100 will be described.

Figure 3:
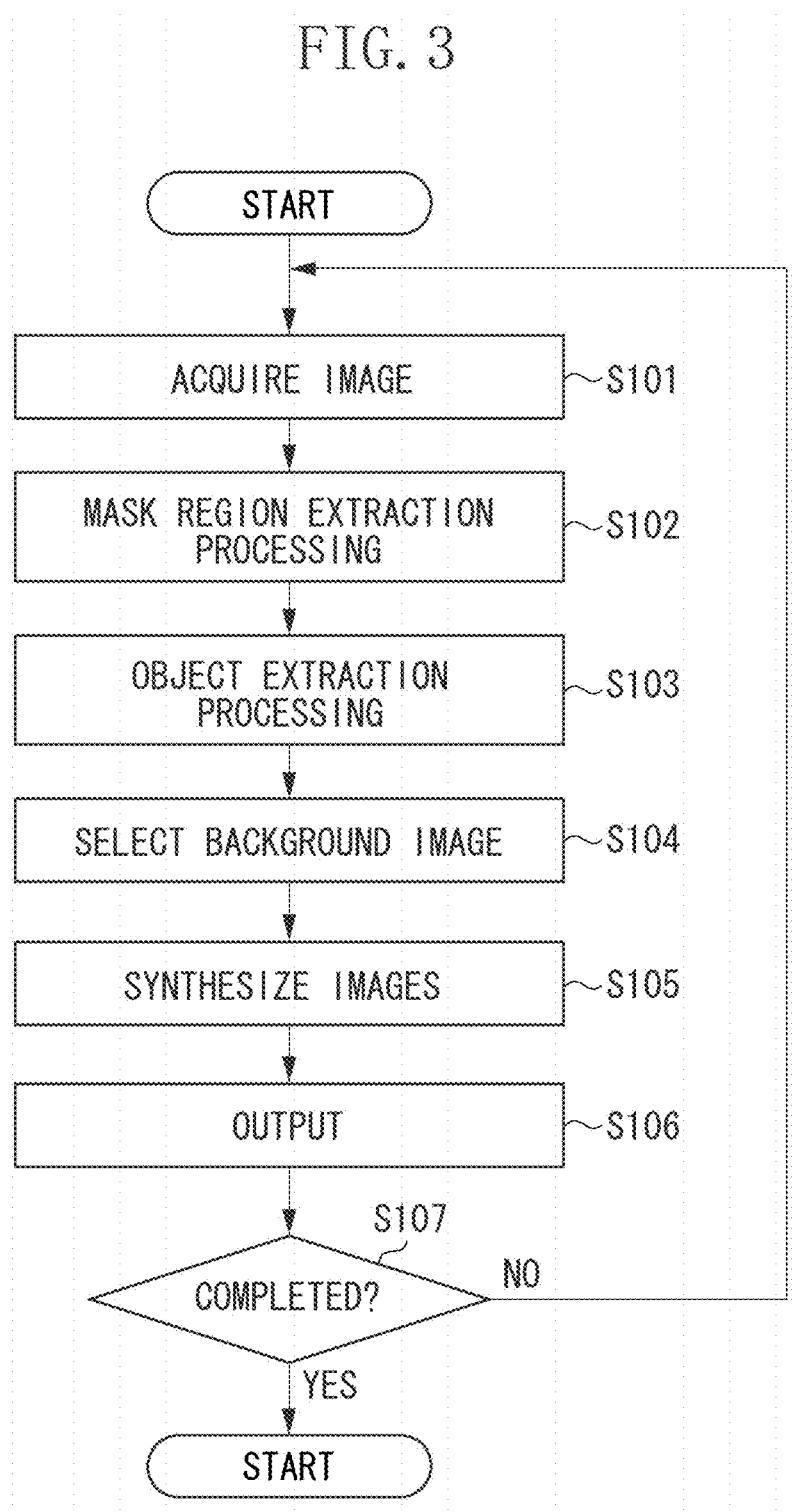
FIG. 3 is a flowchart illustrating processing of the image processing apparatus.

FIG. 3 is a flowchart illustrating an example of the information processing of the image processing apparatus 100 for generating a protection image from images successively input, and outputting the protected image.

Figure 4:
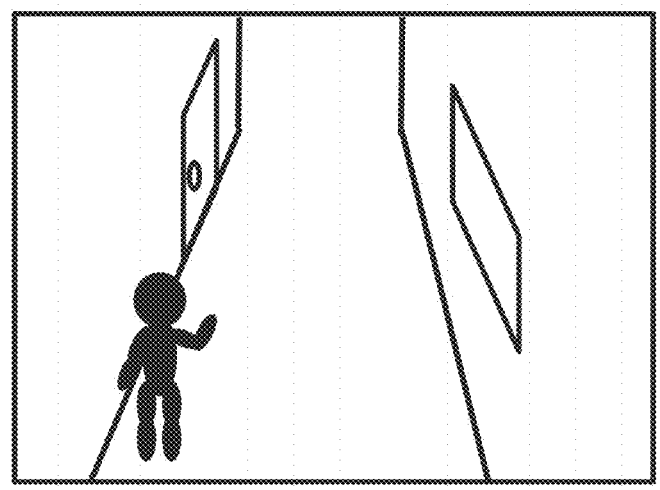
FIG. 4 is a diagram illustrating an example of a captured image.

After starting the processing, in step S101, the image acquisition unit 101 acquires an image. The image acquisition unit 101 stores the acquired image in a memory such as the RAM 13 or the HDD 22. FIG. 4 illustrates an example of an image acquired by the image acquisition unit 101.

Figure 5:
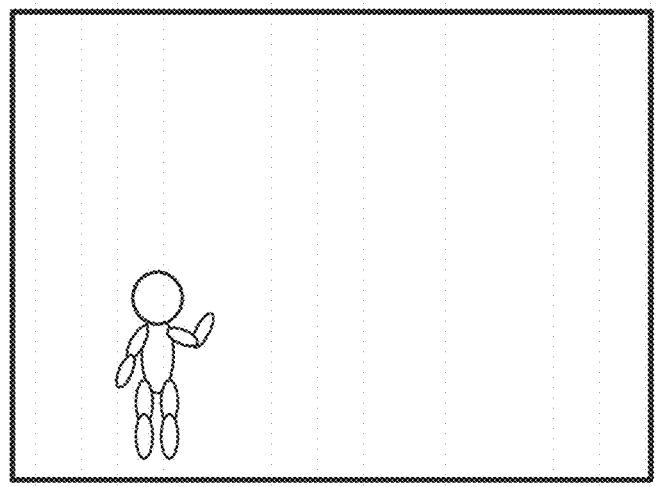
FIG. 5 is a diagram illustrating an example of a mask region of a subject.

In step S102, the mask region extraction unit 102 extracts a mask region of a subject from the image acquired by the image acquisition unit 101. FIG. 5 illustrates an example of the mask region of the subject extracted by the mask region extraction unit 102.

In step S103, the object extraction unit 103 extracts an object region from the image acquired by the image acquisition unit 101.

In step S104, the background management unit 104 selects a background image which is close to the image acquired by the image acquisition unit 101.

Figure 6:
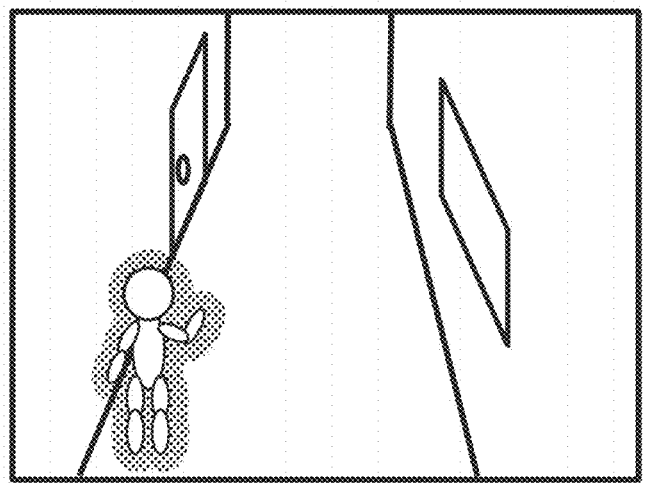
FIG. 6 is a diagram illustrating an example of a privacy protected image.

In step S105, the image synthesis unit 105 synthesizes the background image selected by the background management unit 104 with a mask image of the mask region extracted by the mask region extraction unit 102, to generate a privacy protected image. FIG. 6 illustrates an example of the privacy protected image generated by the image synthesis unit 105.

In step S106, the output unit 106 outputs the privacy protected image to an external apparatus. In step S107, the output unit 106 determines whether an end instruction has been received from the PD 19 or the KB 20. If it is determined that the end instruction has been received (YES in step S107), the output unit 106 ends the flowchart illustrated in FIG. 3. If it is determined that the end instruction has not been received (NO in step S107), the processing returns to step S101.

In the information processing according to the present exemplary embodiment, the image processing apparatus 100 selects a background image close to an input image and synthesizes the selected background image with a mask image of a mask region. Thus, a preferable synthesized image, in which privacy is protected and an environment change is taken into consideration, can be provided to a user.

In a second exemplary embodiment, information processing of an image processing apparatus 100 for selecting a background image using an image capturing state and generating a privacy protected image, will be described.

Figure 7:
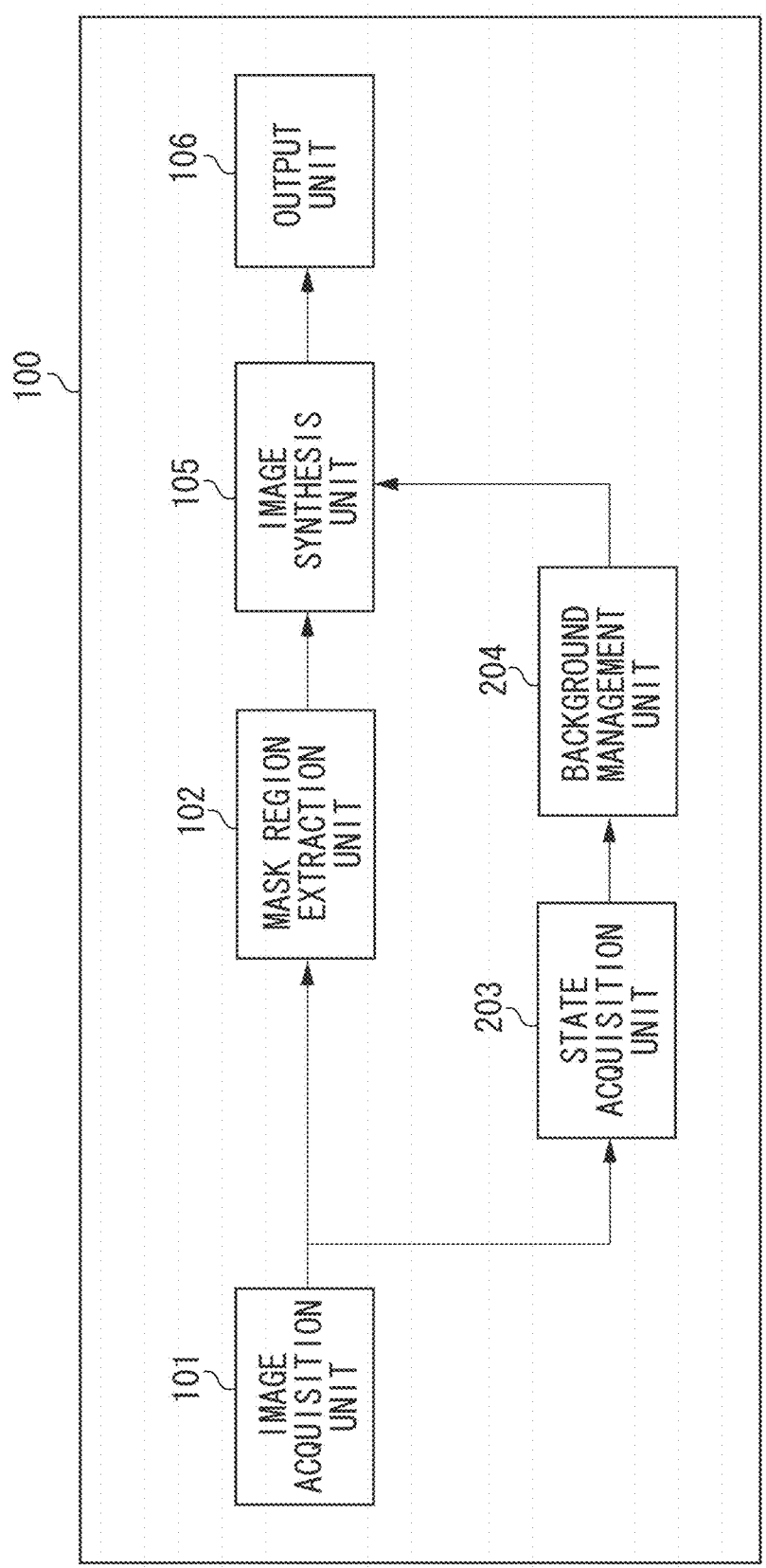
FIG. 7 is a block diagram illustrating a software configuration of an image processing apparatus.

FIG. 7 is a block diagram illustrating an example of a software configuration of the image processing apparatus 100 according to the second exemplary embodiment. Similar components in the first and second exemplary embodiments are denoted by the same reference symbols, and description thereof is omitted. The same applies to other drawings described below.

Figure 8A:
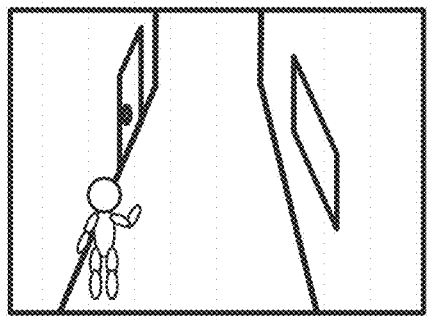
FIGS. 8A to 8C are diagrams each illustrating an example of selection of a background image.
Figure 8B:
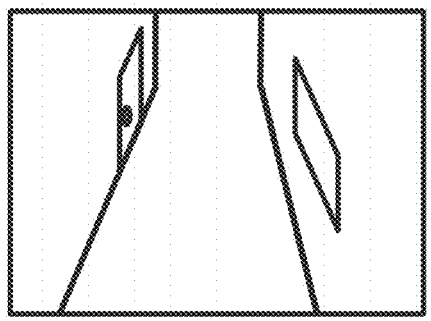
Figure 8C:
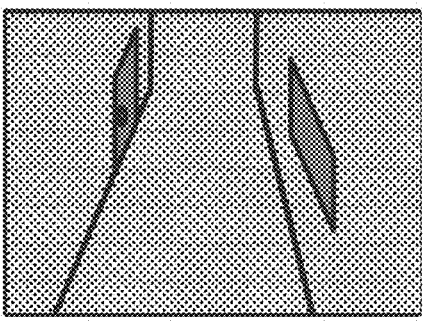

A state acquisition unit 203 estimates an image capturing state from an image acquired by the image acquisition unit 101. The image capturing state means a state within a viewing angle of image capturing. This state is determined based on imaging information acquired from various settings and/or imaging information that can be estimated by analyzing an image and detecting a specific object. The imaging information acquired from various settings includes a time setting of an image capturing unit and settings of the image capturing unit such as an imaging time zone, a season, and an illuminance condition. As to the imaging time zone, morning is from 6:00 AM to 10:00 AM, daytime is from 10:00 AM to 5:00 PM, evening is from 5:00 PM to 7:00 PM, and night is from 7:00 PM to 6:00 AM. The imaging time zone is selected from morning, daytime, evening, and night based on an imaging time acquired from the image capturing unit connected to the image acquisition unit 101. Further, as to the season, dates corresponding to spring, summer, fall, and winter are defined respectively, and the season is selected from spring, summer, fall, or winter based on date acquired from the image capturing unit. The illuminance condition is estimated and acquired by a rule determination based on a gain value and a histogram of a luminance value of an entire image acquired from the image acquisition unit 101. The rule determination is performed based on a combination of conditions for determining a histogram and a gain value. For example, a luminance range is set between 0 and 255, and a gain value is set at 8 steps ranging from 0 to 7. When a mode value of the histogram is 128 or larger and the gain value is 3 or smaller, the illuminance is determined to be sufficient, and when the mode value of the histogram is 64 or smaller and the gain value is 4 or larger, the illuminance is determined to be low. The settings of the image capturing unit are acquired from among the white balance setting, exposure setting, and exposure time setting for the image capturing. Further, the imaging information that can be estimated by analyzing an image and detecting a specific object is acquired by detecting raindrops or snow from the image and estimating the weather. The weather is classified into sunshine, rain, and snow. When rain or snow is not detected, the weather is estimated as sunshine, when raindrops are detected, the weather is estimated as rain, and when snow falling is detected, the weather is estimated as snow. The state acquisition processing is not limited to the above processing. The state acquisition processing may be any processing that can estimate an image capturing state from a captured image. A background management unit 204 manages a plurality of background images and image capturing states of the respective background images. The plurality of background images is one or more images that are captured in a same place and at a same viewing angle as a place and a viewing angle of an image acquired by the image acquisition unit 101 and in different time zones and in different states within the viewing angle. The type of the background images is the same as the type described in the first exemplary embodiment. The background management unit 204 stores these background images as an image file and the image capturing states as a metadata file in the image storage unit (not illustrated). Further, the background management unit 204 selects a background image which is the closest to the image capturing state acquired from the state acquisition unit 203 from the plurality of background images through a rule determination. FIGS. 8A to 8C are diagrams each illustrating an example of selection of a background image using white balance and illuminance. The rule determination condition in the present exemplary embodiment is such that a difference in a white balance value between an image capturing state acquired from the state acquisition unit 203 and a background image is the smallest and the illuminance condition is the same. FIG. 8A illustrates a latest image acquired by the image acquisition unit 101 and an image capturing state acquired by the state acquisition unit 203. FIGS. 8B and 8C illustrate set background images and the image capturing states of the background images. The background management unit 204 determines the image capturing state of the latest image and image capturing states set on background images in accordance with a rule, and selects a background image. In examples of FIGS. 8A to 8C, the background management unit 204 selects the background image in FIG. 8B conforming to the rule as the background image. In examples of FIGS. 8A to 8C, the background management unit 204 has selected the background image based on the white balance and the illuminance condition, but the rule determination conditions may include other items of imaging information such as the same imaging time zone and the same weather. Further, the rule determination may be made not only by logical AND but also by a logical sum of the conditions. For example, the background management unit 204 selects a background image that satisfies any one of the smallest difference in white balance value and the same imaging time zone.

Since the information processing of the second exemplary embodiment is the same as the flow illustrated in FIG. 3 according to the first exemplary embodiment, description thereof is omitted.

In the information processing according to the present exemplary embodiment, the image processing apparatus 100 selects a background image close to an actual world state and synthesizes a mask image of a mask region with the background image. As a result, privacy protection and provision of information about the real world can be achieved at a same time.

In a third exemplary embodiment, information processing of the image processing apparatus 100 for estimating an image capturing state, will be described. In addition to the devices in the second exemplary embodiment, a sensor is used.

Figure 9:
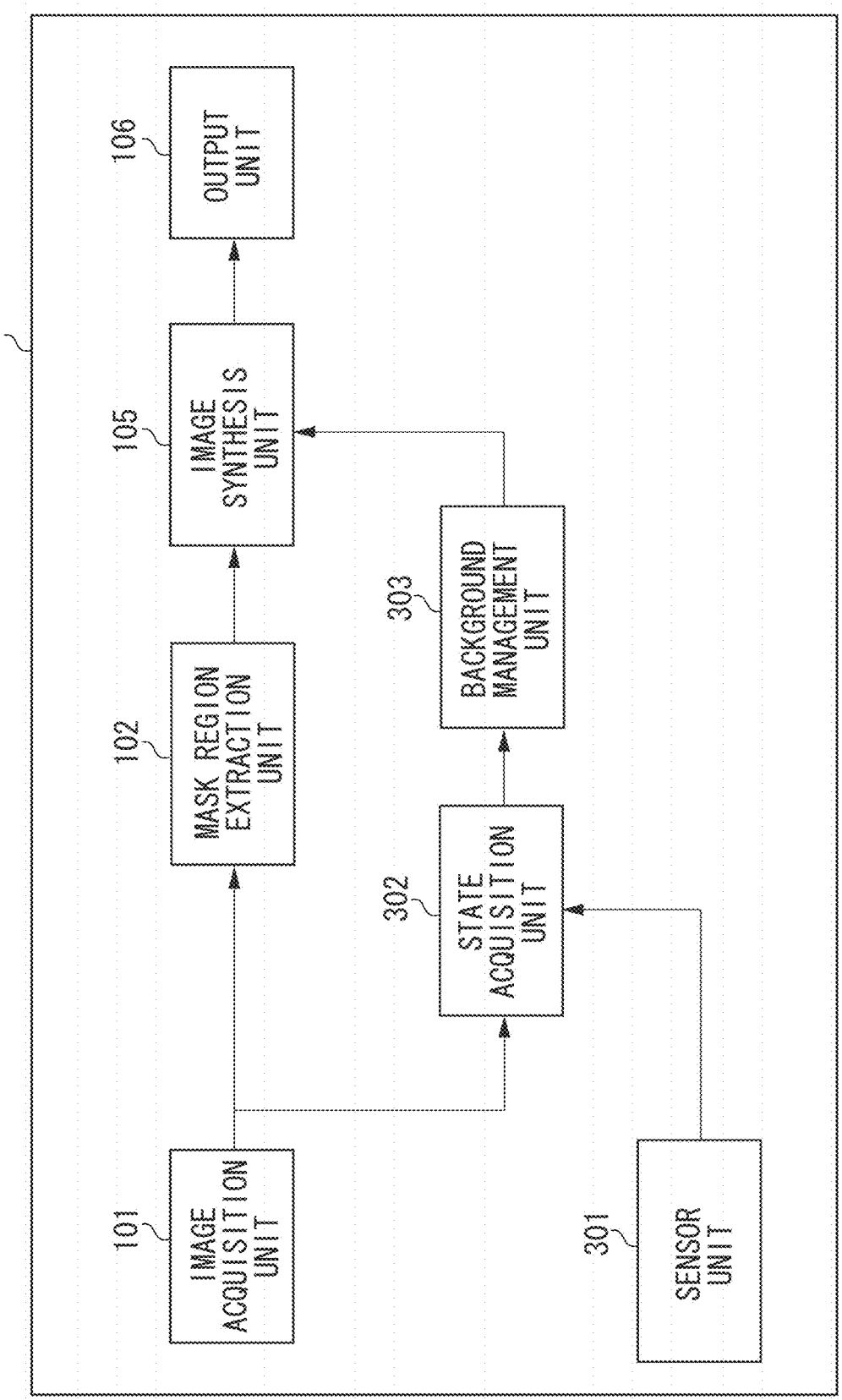
FIG. 9 is a block diagram illustrating a software configuration of the image processing apparatus.

FIG. 9 is a block diagram illustrating an example of a software configuration of the image processing apparatus 100 according to the third exemplary embodiment. A sensor unit 301 acquires sensor information including temperature, humidity, and illuminance of an environment where the image capturing unit is installed, and transmits the sensor information to a state acquisition unit 302.

The state acquisition unit 302 estimates an image capturing state based on an image acquired by the image acquisition unit 101 and the sensor information acquired by the sensor unit 301.

A background management unit 303 manages a plurality of background images and image capturing states of the respective background images. The background management unit 303 then selects, from the plurality of background images, a background image which is most similar to the image capturing state acquired by the image acquired by the state acquisition unit 302 as a closest background image.

In a fourth exemplary embodiment, the image processing apparatus 100 is described in which a privacy protected image generated by synthesizing a mask image with a background image for mask region extraction in addition to the configuration according to the first exemplary embodiment. In the present exemplary embodiment, a difference from the first exemplary embodiment will be described.

A first privacy protected image is generated by synthesizing a mask image with the prepared background image described in the first exemplary embodiment. A second privacy protected image is generated by synthesizing a mask image with a background image for mask region extraction described in the present exemplary embodiment.

The first and second privacy protected images each have an advantage and a disadvantage. The first privacy protected image is generated by synthesizing a mask region of a subject as a privacy protection target with a background image which does not include a privacy protection target. For this reason, its advantage is that a shape and a movement of the subject can be visually recognized and the subject is not exposed. However, an image which is closest to an input image is selected from prepared background images. Thus, its disadvantage is that a background of the subject is similar to the input image but the latest background state is not expressed. On the other hand, the second privacy protected image is generated by using a latest input image. Thus, its advantage is that, unlike the first privacy protected image, the second privacy protected image has a subject background which expresses the latest background state comparatively accurately. However, the second privacy protected image has the disadvantage that an image in which privacy of the subject is not protected is generated when the subject is exposed on the background image for mask region extraction and thus privacy protection may not be attained. As the case where the subject is exposed, two cases can be considered. One case is that the subject is fixed and present on the same positions of stored images necessary for generating an average image. The other case is that detection of the subject fails with the object recognition method.

According to the above advantages and disadvantages, privacy protected images are switched by utilizing the above-described advantages, and thus more preferably, privacy protection and provision of information about the real world can be achieved.

Therefore, in the present exemplary embodiment, the image synthesis unit 105 further includes a face detection unit (not illustrated), and performs face detection processing on a background image for mask region extraction. The image synthesis unit 105 then generates the first privacy protected image when a face is detected, and generates the second privacy protected image when a face is not detected. It is not limited to the face detection unit, and any method for extracting a privacy protection target from a background image for mask region extraction may be used. Alternatively, another detection unit such as a person detection unit may be used.

Other Embodiments

In the present invention, a program that realizes one or more functions according to the above exemplary embodiments is supplied to a system or an apparatus via a network or a storage medium. The present invention can be realized also by the processing in which one or more processors in a computer of the system or the apparatus loads and executes a program. Further, the present invention can be realized also by a circuit that realizes one or more functions (e.g., application-specific integrated circuit (ASIC)).

The exemplary embodiments of the present invention have been described above, but the present invention is not limited to such specific exemplary embodiments.

For example, a part of or whole of the software configuration of the image processing apparatus 100 may be mounted as a hardware configuration on the image processing apparatus 100. Further, the hardware configuration of the image processing apparatus 100 is just an example, and the PD 19, the KB 20, the CRT 21, and the HDD 22 may be external hardware of the image processing apparatus 100.

In the processing according to the above exemplary embodiments, a suitable background image can be selected for an image that has been subjected to privacy protection.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-215302, filed Nov. 2, 2016, and No. 2017-150018, filed Aug. 2, 2017, which are hereby incorporated by reference herein in their entirety.

What is claimed is:

1. An image processing apparatus comprising a computer executing instructions that, when executed by the computer, cause the computer to function as:
    an acquisition unit configured to acquire a captured image captured by an image capturing unit;
    a region extraction unit configured to extract a region corresponding to a human body from the captured image;
    a selection unit configured to select a background image from a plurality of background images;
    a processing unit configured to perform image processing for obscuring the region in the background image selected by the selection unit; and
    a determination region obtaining unit configured to acquire object region information of the captured image and remove the object region from the captured image to obtain a determination region,
    wherein the selection unit selects the background image based on similarity between the determination region of the captured image and corresponding region in each of the plurality of background images.

2. The image processing apparatus according to claim 1, wherein the plurality of background images comprise a plurality of images captured at a same angle of view as an angle of view of the captured image.

3. The image processing apparatus according to claim 1, wherein the processing unit performs the image processing corresponding to masking the region in the background image selected by the selection unit, to generate a protected image.

4. The image processing apparatus according to claim 3, further comprising an output unit configured to output the protected image.

5. The image processing apparatus according to claim 1, wherein the background image is selected based on similarity between a first image feature of the determination region in the captured image and a second image feature of the determination region in each of the plurality of background images, and
    wherein the second image feature is one of a plurality of image features of regions in the plurality of background images, and the similarity is highest among a plurality of similarities between the first image feature and the plurality of image features, respectively.

6. An image processing method comprising:
acquiring a captured image;
extracting a region corresponding to a human body from the captured image;
selecting a background image from a plurality of background images;
performing image processing for obscuring the region in the background image selected in the selecting; and
acquiring object region information of the captured image and removing the object region from the captured image to obtain a determination region,
wherein the background image is selected based on similarity between the determination region of the captured image and corresponding region in each of the plurality of background images.

7. The image processing method according to claim 6, wherein the plurality of background images comprises a plurality of images captured at a same angle of view as an angle of view of the captured image.

8. The image processing method according to claim 6, wherein a protected image is generated by masking the region in the background image selected in the selecting and a mask image for masking the region.

9. The image processing method according to claim 6, wherein the background image is selected based on similarity between a first image feature of the determination region in the captured image and a second image feature of the determination region in each of the plurality of background images, and wherein the second image feature is one of a plurality of image features of regions in the plurality of background images, and the similarity is highest among a plurality of similarities between the first image feature and the plurality of image features, respectively.

10. A non-transitory storage medium storing a program for causing a computer to function as:
an acquisition unit configured to acquire a captured image captured by an image capturing unit;
a region extraction unit configured to extract a region corresponding to a human body from the captured image;
a selection unit configured to select a background image from a plurality of background images;
a processing unit configured to perform image processing for obscuring the region in the background image selected by the selection unit; and
a determination region obtaining unit configured to acquire object region information of the captured image and remove the object region from the captured image to obtain a determination region,
wherein the selection unit selects the background image based on similarity between the determination region of the captured image and corresponding region in each of the plurality of background images.

* * * * *